April 14, 1959　　　R. K. STRASEL　　　2,882,063
ADJUSTABLE WHEEL MOUNTING FOR LAWN MOWER
Filed Sept. 9, 1957
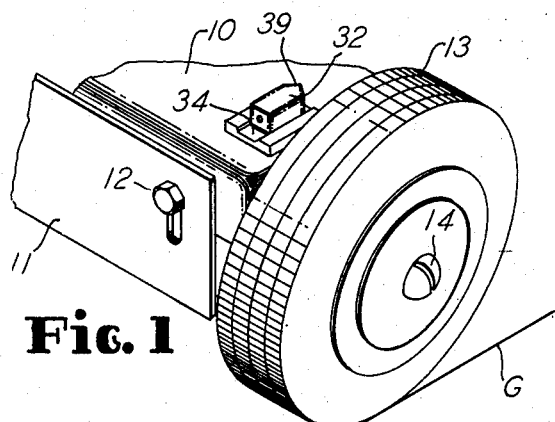
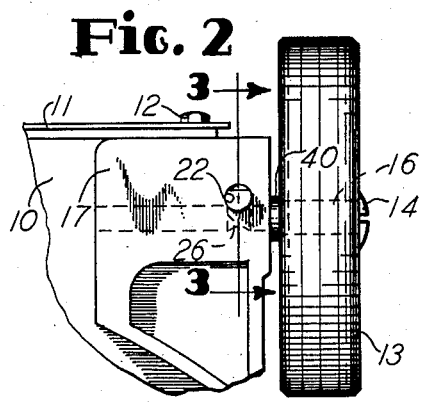
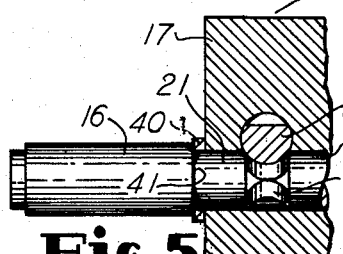
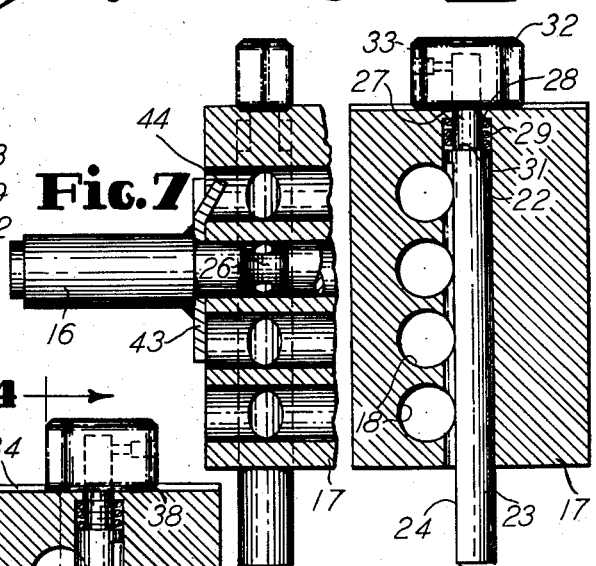
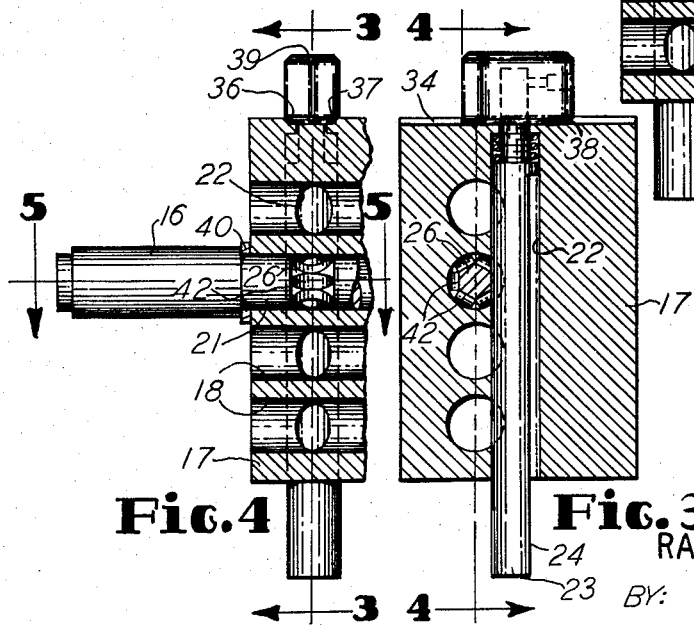
INVENTOR:
RAYMOND K. STRASEL
BY: *Arthur J. Hansmann*
ATTORNEY

United States Patent Office 2,882,063
Patented Apr. 14, 1959

2,882,063

ADJUSTABLE WHEEL MOUNTING FOR LAWN MOWER

Raymond K. Strasel, Winthrop Harbor, Ill., assignor to Jacobsen Manufacturing Co., Racine, Wis., a corporation of Wisconsin Application September 9, 1957, Serial No. 682,864

6 Claims. (Cl. 280—43)

This invention relates to an adjustable wheel mounting for a lawn mower and, more particularly, it relates to a lawn mower wheel mounting wherein the ground wheels can be adjusted in their elevational positions on the lawn mower.

It is an object of this invention to provide an adjustable wheel mounting for a lawn mower wherein the lawn mower ground wheels can be readily and easily adjusted in the vertical plane so that the lawn mower housing will be raised or lowered with respect to the ground.

Another object of this invention is to provide a lawn mower adjustable wheel mounting wherein the wheel axle or shaft is secured in a non-rotatable position and is firmly fixed in position so that there is no end play as well as no rotation of the axle.

Still another object of this invention is the accomplishment of the first-mentioned object in conjunction with providing a means whereby the operator can readily detect whether or not the wheel mounting is locked in position of use.

Other objects and advantages will become apparent upon reading the following description in conjunction with the accompanying drawings, wherein:

Fig. 1 is a front perspective view of a fragment of a lawn mower incorporating a preferred embodiment of this invention.

Fig. 2 is a bottom plan view of the fragment shown in Fig. 1.

Fig. 3 is an enlarged sectional view taken on the line 3—3 of Fig. 2, and it is also indicated as a sectional view on the line 3—3 of Fig. 4.

Fig. 4 is a sectional view taken on the line 4—4 of Fig. 3.

Fig. 5 is a sectional view taken on the line 5—5 of Fig. 4.

Fig. 6 is a sectional view similar to Fig. 3 except with parts in a different position and the wheel axle removed.

Fig. 7 is a fragmentary sectional view similar to that of Fig. 4 but showing another embodiment of the invention.

Similar reference numerals refer to similar parts throughout the views.

Figs. 1 and 2 show the lawn mower housing or deck 10 which has the usual guard 11 adjustably attached to the front of the mower by means of the mounting bolt 12. A ground wheel 13 is shown mounted on the mower by means of the usual bolt 14 which threads directly into the end of the wheel axle or shaft 16. Of course, there are four such wheels 13, and each is adjustably mounted in the manner hereinafter described so that the elevation of the housing 10 and its attached parts can be varied as desired with respect to the ground indicated by the line "G" in Fig. 1.

Incorporated in, or attached to, the housing 10 is a section or mounting block 17 with one such block located laterally within the position of each wheel 13 as shown in Figs. 1 and 2. Figs. 3 and 4 show the block 17 to be provided with four horizontally disposed vertically spaced apart holes 18 which extend into the block and snugly receive the inner end of the axle 16 with said end including the end portion 19 and the intermediate portion 21. In this arrangement, the axle 16 is snugly disposed within one of the holes or openings 18 and, of course, the axle 16 can be withdrawn from the one hole in which it is shown disposed, and it can be reinserted into any one of the other three holes to thereby vary its vertical position on the mounting block 17. The block 17 is also provided with a vertically disposed hole or opening 22, such that the holes 18 and the vertical hole 22 slightly intersect along the sides of the holes, as clearly shown in Figs. 3 and 4. A spindle or rod 23 is snugly rotatably disposed within the vertical opening 22, and the rod 23 is primarily cylindrical except for a relieved or flat face 24 which extends along the spindle for the height occupied by the holes 18.

Figs. 2, 3 and 4 further show that the axle 16 includes a reduced portion 26, and such portion 26 is disposed in the plane of the spindle 23 for the purpose of receiving the circular side of the spindle 23 when the latter is in the position shown in Figs. 2, 3 and 4. In this manner, axle 16 and the spindle 23 are in interference with each other so that the axle 16 cannot move axially in either direction, and the axle is, therefore, axially secured in the block 17. Fig. 5 also shows the relation between the axle 16 and the spindle 23.

Fig. 6 shows the spindle 23 in a position one-half turn out of the position in the other drawings, and in the Fig. 6 position the flat face 24 is shown to be clear of the horizontal openings 18. Thus, in the Fig. 6 position of the spindle, the axle 16 can be moved axially in the holes 18, and by this means the axle can be relocated in the holes 18. It will also be seen that the upper end of the spindle 23 includes a reduced portion 27, and the block 17 has a shoulder portion 28. A compression spring 29 is concentrically disposed around the spindle portion 27 to bear upwardly on the block shoulder 28 and bear downwardly on the shoulder 31 of the spindle 23. In this manner, the spindle 23 is urged downwardly, and the structure just described forms a part of the locking means which maintains the spindle in its selected rotated position of either Fig. 3 or Fig. 6. The remainder of the locking means is shown to include a selector button or a member 32 which is secured to the spindle portion 27 by means of a set screw 33 or the like. Also, the top surface of the block 17 includes a groove or depression 34 as shown in Figs. 1 and 3. The width of the groove 34 is similar to the width of the member 32 so that the latter is retained within the side walls defining the groove 34, and the action of the spring 29 urging downwardly on both the spindle 23 and the member 32 causes the latter to remain in the groove 34. Of course, when it is desired to change the spindle position between the Fig. 3 and the Fig. 6 positions, merely turning the button one half turn will cause it to slide over the side walls defining the groove 34, as both the lower edges of the button 32 and the walls of the groove 34 are preferably inclined or beveled. Figs. 4 and 7 show the groove walls 36 and 37 to be inclined and Fig. 3, along with Figs. 4 and 7, shows the lower edge of the button to be similarly inclined as at 38, and thus the button can be easily rotated as mentioned, but when no rotation is given to the button 32, then the button, along with the spindle 23, will remain fixed in either selected position. The drawings also show that the button 32 includes a pointer or indicator end 39, and by this means, the operator can readily determine which position the spindle is in; that is, whether the spindle is in the axle locking position of Fig. 3 or whether it is in the axle releasing position of Fig. 6. In the instance shown, the indicator 39 points rearwardly of the mower in the axle locking position.

Figs. 2, 4 and 5 show a spacer 40 disposed between a shoulder 41 on the axle 16 and the side of the block 17 to space the wheel 13 from the block, and the shoulder and spacer axially locate the axle portion 26 with respect to the block so that the axle is held tightly against the side of the block and the following described faces 42 register with the opening 22.

In the mounting of the axle 16, it is also desirable to maintain the axle in a non-rotatable position, and to this end Figs. 3 and 4 show one embodiment for non-rotatably maintaining the axle, and Fig. 7 shows another embodiment. In the first embodiment, it will be noticed that the axle portion 26 has formed thereon a plurality of faces 42 such that the portion 26 is hexagonal in cross-section, and one of the faces 42 can abut the spindle 23 in the Fig. 3 position of the spindle, and by this means the axle 16 is secured in the non-rotatable position by virtue of the faces 42 extending along and abutting the spindle 23, as shown.

Fig. 7 shows another embodiment of the means for non-rotatably securing the axle 16, and in this instance the washer 40 is replaced by a larger washer 43 which is non-rotatably secured to the axle 16, such as by welding as shown. The washer 43 is preferably circular and has stamped therein an offset or projection 44 which extends from the axle 16 a distance sufficient to be disposed within the next adjacent opening 18. With the axle 16 axially fixed in the mounting 17 and with the projection 44 disposed within an opening 18, the washer 43 will secure the axle 16 against rotation as desired. In the Fig. 7 embodiment, the axle portion 26 does not then contain the faces 42 as shown in Fig. 4.

While specific embodiments of this invention have been shown and described, it should be apparent that changes could be made in the embodiments, and the invention should, therefore, be limited only by the scope of the appended claims.

What is claimed is:

1. An adjustable mounting for a lawn mower wheel, comprising a lawn mower deck, a mounting block attached to said deck and having a vertical opening and a plurality of horizontal openings vertically spaced apart and intersecting said vertical opening along a side thereof, a spindle rotatably mounted in said vertical opening and including a first side projecting into said horizontal openings in a first position and having a relieved face on a second side of said spindle, selector button means on the upper end of said spindle for selectively rotating the latter to a second position wherein said relieved face is presented toward said horizontal openings, lock means for releasably securing said spindle in said first position, a wheel axle snugly disposed in a selected one of said horizontal openings and extending past said spindle in a reduced portion and including an enlarged portion of the size of said opening on each side of said reduced portion for interfering with said spindle to prevent axial movement of said axle and with said axle projecting to one side of said block, said axle having a face thereon in the extent past said spindle for abutting said spindle in the urging of rotation of said axle for securing the latter against rotation, and a ground wheel rotatably mounted on the projecting end of said axle for supporting said deck a selected distance above the ground depending upon which of said horizontal openings is selected for said axle.

2. An adjustable mounting for a lawn mower wheel, comprising a lawn mower deck, a mounting block attached to said deck and having a vertical opening and a plurality of horizontal openings vertically spaced apart and intersecting said vertical opening along a side thereof, a spindle rotatably mounted in said vertical opening and including a first side projecting into said horizontal openings in a first position and having a relieved face on a second side of said spindle wherein said relieved face can be presented toward said horizontal openings, lock means operatively associated between said block and said spindle for releasably securing said spindle in said first position, a wheel axle snugly disposed in a selected one of said horizontal openings and extending past said spindle in a reduced portion and including an enlarged portio of the size of said opening on each side of said reduced portion for interfering with said spindle to prevent axial movement of said axle and with said axle projecting to one side of said block, means on said axle and extending therefrom and engaged in an unoccupied one of said openings adjacent said axle for non-rotatably locking the latter with said block, and a ground wheel rotatably mounted on the projecting end of said axle for supporting said deck a selected distance above the ground depending upon which of said horizontal openings is selected for said axle.

3. An adjustable wheel mounting for a lawn mower or the like, comprising a mounting block included in said lawn mower, said mounting having a plurality of horizontally disposed and vertically spaced holes, a wheel axle snugly disposed in a selected one of said holes and projecting to one side of said block, a spindle rotatable in said block and extended past said holes for engaging said axle to restrain the later against axial movement and said spindle being rotatable for disengaging said axle, said axle having a face thereon in the extent past said spindle for abutting said spindle in the urging of rotation of said axle in both directions of rotation of said axle for locking said axle against rotation, lock means on said block and engaged with said spindle for releasably holding the latter in engagement with said axle, and a ground wheel rotatably mounted on said axle.

4. An adjustable wheel mounting for a lawn mower or the like, comprising a mounting block included in said lawn mower, said mounting having a plurality of horizontally disposed and vertically spaced holes, a wheel axle snugly disposed in a selected one of said holes and projecting to one side of said block, means on said block for engaging said axle to restrain the latter against axial movement and said means being operable for disengaging said axle, lock means on said block and engaged with the first-mentioned said means for releasably holding the latter in engagement with said axle, means fixed on said axle and extending therefrom a distance sufficient to engage one of said holes for locking said axle against rotation, and a ground wheel rotatably mounted on said axle.

5. An adjustable mounting for a lawn mower wheel, comprising a lawn mower deck, a mounting block attached to said deck and having a vertical opening and a plurality of horizontal openings vertically spaced apart and intersecting said vertical opening along a side thereof, said block also having a groove in the top thereof, a spindle rotatably mounted in said vertical opening projecting above said block and including a first side projecting into said horizontal openings in a first position and having a relieved face on a second side of said spindle for clearing said horizontal openings when said second side is disposed toward said horizontal openings, selector button means on the upper end of said spindle and disposed with the lower edge thereof in said groove and said means being for selectively rotating said spindle to a second position wherein said relieved face is presented toward said horizontal openings, a spring disposed in said vertical opening yieldably urging said spindle downward to where said lower edge of said button means is releasably secured in said groove of said block for releasably securing said spindle in said first position, a wheel axle snugly disposed in a selected one of said horizontal openings and extending past said spindle in a reduced portion and including an enlarged portion of the size of said opening on each side of said reduced portion for interfering with said spindle to prevent axial movement of said axle and with said axle projecting to one side of said block, means on said axle for securing the latter against rotation, and a ground wheel rotatably mounted on the projecting end of said axle for supporting said deck a selected distance above the ground depending upon which of said horizontal openings is selected for said axle.

6. An adjustable wheel mounting for a lawn mower or the like, comprising a mounting block included in said lawn mower, said mounting block having a plurality of horizontally disposed and vertically spaced holes, a wheel axle snugly disposed in a selected one of said holes and having a reduced portion along the length thereof, a spindle rotatable in said block and transversely intersecting said holes and having a side disposed in said reduced portion of said axle for engaging said axle to restrain the latter against axial movement and said spindle being rotatable and including a relieved side for disengaging said axle when said relieved side is rotated toward said axle, said reduced portion of said axle including a plurality of faces spaced around said axle for abutting said spindle in the urging of rotation of said axle in both directions of rotation of said axle for locking said axle against rotation, lock means on said block and engaged with said spindle for releasably holding the latter in engagement with said axle, and a ground wheel rotatably mounted on said axle.

References Cited in the file of this patent

UNITED STATES PATENTS

| | | |
|---|---|---|
| 711,948 | Dodge | Oct. 28, 1902 |
| 1,842,697 | Stenberg | Jan. 26, 1932 |

FOREIGN PATENTS

| | | |
|---|---|---|
| 200,490 | Australia | Dec. 13, 1955 |